2,900,753

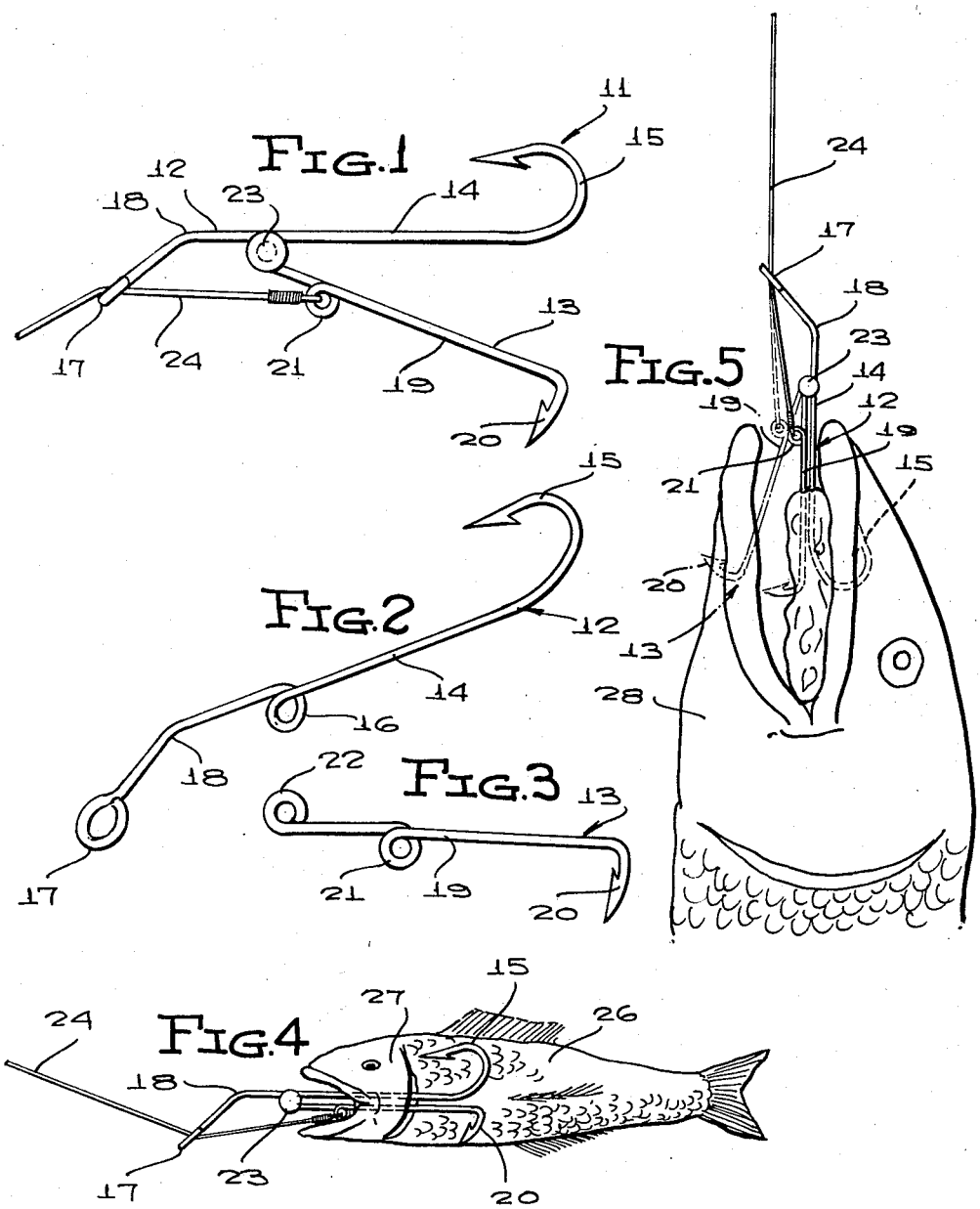

FISH HOOK

Park Millard Griffith, Mitchellville, Iowa

Application December 20, 1957, Serial No. 704,199

1 Claim. (Cl. 43—37)

This invention relates to fishermen's equipment, and more particularly to an improvement in fish hooks.

The main object of the invention is to provide a novel and improved fish hook which is simple in construction, which involves relatively few parts, and which is provided with means for securely holding a fish even in the event that a fish strikes relatively lightly at the hook.

A further object of the invention is to provide an improved fisherman's trap hook which is inexpensive to fabricate, which is durable in constructon, and which may be employed for a wide variety of different types of fishing and which is designed to trap fish which strike relatively lightly at the hook.

Further objects and advantages of the invention will become apparent from the following description and claim, and from the accompanying drawings, wherein:

Figure 1 is a side elevational view of an improved fisherman's hook constructed in accordance with the present invention.

Figure 2 is a side elevational view of the main fish hook member of the hook assembly shown in Figure 1.

Figure 3 is a side elevational view of the auxiliary hook member employed in the assembly of Figure 1.

Fig. 4 is a side elevational view illustrating the manner in which the trap hook assembly of Figures 1 to 3 is engaged with a bait fish.

Figure 5 is a side elevational view illustrating the manner in which the trap hook assembly of Figure 1 operates to securely hold a fish striking at the hook.

Referring to the drawings, the improved trap hook assembly is designated generally at 11 and comprises a main fish hook 12 and an auxiliary fish hook 13 pivoted to the intermediate portion of the shank of the main fish hook. Thus, as shown in Figure 2, the main fish hook 12 comprises a shank 14 and an outwardly directed barb portion 15, the shank 14 being formed at its intermediate portion with an eye loop 16 and being formed at its end portion with another eye loop 17, the portion of the shank adjacent the eye loop 17 being inclined outwardly at an obtuse angle with respect to the axis of the shank, as by forming a bend 18 in the shank, as illustrated in Figure 2. Thus, the end loop 17 is offset relative to the shank in a direction opposite to the direction of the hook barb 15.

The auxiliary hook 13 comprises a shank portion 19 and an outwardly directed barb portion 20, said shank portion being formed with the intermediate eye loop 21 and with the end eye loop 22. The eye loop 22 is engaged with the eye loop 16 and is pivotally connected thereto by a rivet 23, whereby the auxiliary hook 13 is hingedly connected to the intermediate portion of the shank 14 of the main hook 12 for swinging movement substantially in the plane of the main hook barb member 15 and in a direction opposite to that of said main hook barb, the barb element 20 of the auxiliary hook 13 projecting outwardly in a direction opposite to the direction of the main hook barb 15. Thus, the eye loop 17 of the main hook 12 is offset outwardly in the same direction as the direction of swing of the auxiliary hook 13.

Designated at 24 is a flexible line element, for example, a cable leader, or similar member, which extends slidably through the eye loop 17 and which is fastened to the eye loop 21, the flexible member 24 being connected to the fishing rod through the usual fishing line.

The auxiliary hook 13 normally is freely swingable around the pivot element 23 and may be swung outwardly by exerting tension on the flexible cable leader or line 24, the auxiliary element 13 being swingable outwardly to an angle of at least 90 degrees relative to the main shank 14 of the main hook member of the assembly.

In using the trap hook assembly 11, the main hook and auxiliary hooks are engaged through a bait fish, such as a minnow 26, shown in Figure 4, in the manner therein illustrated, so that the barb portions 15 and 20 are exposed beyond the gill 27 of the bait fish. Thus, the bait fish holds the shank elements 14 and 19 in proximity to each other while the bait fish 26 is engaged with the device. As shown in Figure 5, when a fish 28 strikes at the baited hook, the tension on the flexible leader element 24 causes the auxiliary hook member 13 to be swung outwardly with respect to the main hook, whereby the oppositely directed barb portions 15 and 20 securely engage in the mouth of the fish 28, securely fastening the fish to the line and preventing the fish 28 from stealing the bait 26, as often occurs when ordinary hooks are used. As will be readily apparent, any pull on the bait 26 is transmitted to the flexible line element 24, which is controlled by the fisherman, and the tension in the line element 24 therefore causes an outward torque to be applied to the auxiliary hook 13 as above mentioned, which causes the bar elements 15 and 20 to become embedded in the mouth of the striking fish 28.

Obviously, the trap hook assembly 11 may be engaged with any type of bait in a manner analogous to that shown in Figure 4, namely, to cause a striking fish to exert a pull on the bait and to thus cause outward torque to be transmitted to the auxiliary hook element 13.

While a specific embodiment of an improved trap hook assembly has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In combination, a main fish hook comprising a shank having an eyelet at one end and an outwardly directed barb portion at its other end, said shank being formed with an eyelet loop at its intermediate portion, said shank being formed with a bend between said first-named eyelet and said eyelet loop so that the portion of the shank having the eyelet is angled outwardly at an obtuse angle to the remainder of the shank and so that said portion is inclined outwardly in a direction opposite to the direction of said barb portion, an auxiliary fish hook having a shank and a barb portion, said last-named shank being formed with an eyelet loop at its end and with an eyelet loop at its intermediate portion, pivot means connecting the end eyelet loop of the auxiliary fish hook to the intermediate eyelet loop of the main fish hook, said auxiliary fish hook having a barb portion projecting outwardly in a direction opposite to and away from that of the barb portion of the main fish hook, and a flexible line element extending slidably through the eyelet on the end of the first-named shank and extending directly to and secured to the eyelet loop at the intermediate portion of the shank of the auxiliary fish hook.

References Cited in the file of this patent

UNITED STATES PATENTS

| | | |
|---|---|---|
| 68,027 | Angiland | Aug. 27, 1867 |
| 2,763,084 | Goldklang | Sept. 18, 1956 |

FOREIGN PATENTS

| | | |
|---|---|---|
| 150 | Great Britain | Jan. 21, 1867 |
| 9,219 | Great Britain | Apr. 18, 1912 |
| 18,397 | Great Britain | Oct. 4, 1895 |